United States Patent
Tamaki

(10) Patent No.: US 12,012,111 B2
(45) Date of Patent: Jun. 18, 2024

(54) VEHICLE CONTROL SYSTEM

(71) Applicant: TOYOTA JIDOSHA KABUSHIKI KAISHA, Toyota (JP)

(72) Inventor: Nariaki Tamaki, Toki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 236 days.

(21) Appl. No.: 17/521,171

(22) Filed: Nov. 8, 2021

(65) Prior Publication Data
US 2022/0219709 A1    Jul. 14, 2022

(30) Foreign Application Priority Data

Jan. 14, 2021   (JP) .................. 2021-004329

(51) Int. Cl.
*B60W 50/00*    (2006.01)
*B60W 60/00*    (2020.01)

(52) U.S. Cl.
CPC .......... *B60W 50/00* (2013.01); *B60W 60/001* (2020.02); *B60W 2556/45* (2020.02)

(58) Field of Classification Search
CPC ............ B60W 50/00; B60W 60/001; B60W 2556/45; G05D 2201/0213; G05D 1/0282;
(Continued)

(56) References Cited

U.S. PATENT DOCUMENTS 10,211,977 B1 *   2/2019   Roth .............. H04L 9/3234
10,285,051 B2 *   5/2019   Alfred ............ H04L 9/0838
(Continued)

FOREIGN PATENT DOCUMENTS

CN   107683583 A   *   2/2018   ............ G06F 21/44
JP   2004254120 A   *   9/2004
(Continued)

OTHER PUBLICATIONS

Chandra, S et al, "A comparative survey of Symmetric and Asymmetric Key Cryptography," 2014 International Conference on Electronics, Communication and Computational Engineering, Hosur, India, 2014, pp. 83-93[online], [retrieved on Mar. 19, 2023] at <https://ieeexplore.ieee.org/abstract/document/7086640> (Year: 2014).*

*Primary Examiner* — Peter D Nolan
*Assistant Examiner* — Peter Y Ning
(74) *Attorney, Agent, or Firm* — Oliff PLC

(57) ABSTRACT

A vehicle control system, including: a vehicle control section and a control server, wherein: the vehicle control section generates a common key for special mode control by random number generation, outputs the generated common key to the control server, and stores the generated common key in secure storage including a function that protects integrity and confidentiality of data; the control server stores the common key, applies the common key to a control signal to generate a message authentication code, and outputs the message authentication code and the control signal; the vehicle control section applies the common key to the control signal to generate a message authentication code and, when the message authentication code matches the message authentication code, implements control according to the control signal in the special mode; and when control in the special mode ends, the control server erases the stored common key.

12 Claims, 7 Drawing Sheets

(58) Field of Classification Search
CPC ... H04W 12/03; H04W 12/106; H04W 12/64; H04W 12/0471; G08C 17/00; B60R 25/20; B60R 25/10; B62D 63/02; B62D 63/04; H04L 63/123; H04L 63/1441; H04L 67/12

See application file for complete search history.

(56) References Cited

U.S. PATENT DOCUMENTS

| | | | | |
|---|---|---|---|---|
| 10,728,230 | B2* | 7/2020 | Lawson | H04W 12/069 |
| 11,184,340 | B2* | 11/2021 | Winkelvos | H04L 63/062 |
| 2013/0225132 | A1* | 8/2013 | Payan | G05B 15/02 |
| | | | | 455/411 |
| 2015/0046998 | A1* | 2/2015 | Harwood | G06F 21/60 |
| | | | | 726/7 |
| 2015/0324583 | A1* | 11/2015 | Emele | G06F 21/572 |
| | | | | 726/23 |
| 2016/0344705 | A1* | 11/2016 | Stumpf | H04L 9/3213 |
| 2017/0302452 | A1* | 10/2017 | Nanjundappa | B60R 16/023 |
| 2018/0310173 | A1* | 10/2018 | Yonemura | H04L 9/30 |
| 2019/0020469 | A1* | 1/2019 | Dottax | H04W 12/069 |
| 2019/0028267 | A1* | 1/2019 | Takemori | H04L 9/3242 |
| 2019/0028988 | A1* | 1/2019 | Yao | H04W 12/06 |
| 2019/0319781 | A1* | 10/2019 | Chhabra | G06F 3/0673 |
| 2020/0313890 | A1* | 10/2020 | Mondello | H04L 9/0894 |
| 2020/0358618 | A1* | 11/2020 | Lee | H04L 9/0819 |
| 2020/0369242 | A1* | 11/2020 | Komedani | B60R 25/24 |
| 2023/0249499 | A1* | 8/2023 | Bill | B60C 23/0422 |
| | | | | 340/447 |

FOREIGN PATENT DOCUMENTS

| | | | | | |
|---|---|---|---|---|---|
| JP | 2008028849 | A | * | 2/2008 | |
| JP | 2012090231 | A | * | 5/2012 | |
| JP | 2012235214 | A | * | 11/2012 | H04L 9/0844 |
| JP | 2019-140577 | A | | 8/2019 | |
| JP | 2021190819 | A | * | 12/2021 | |
| WO | WO-2018125989 | A2 | * | 7/2018 | G06F 16/1824 |

* cited by examiner

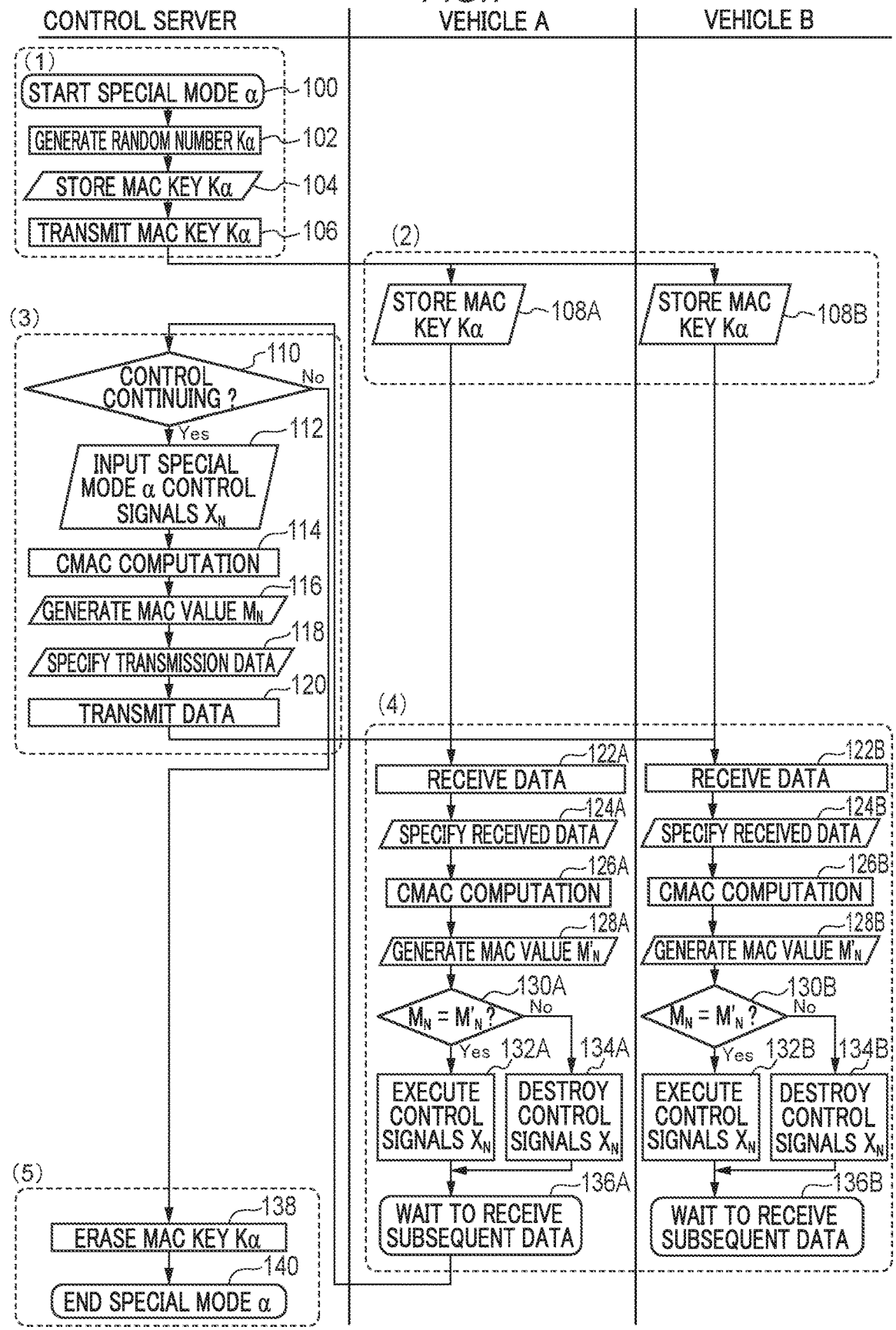

VEHICLE CONTROL SYSTEM

CROSS-REFERENCE TO RELATED APPLICATION

This application is based on and claims priority under 35 USC 119 from Japanese Patent Application No. 2021-004329 filed on Jan. 14, 2021, the disclosure of which is incorporated by reference herein.

BACKGROUND

Technical Field

The present disclosure relates to a vehicle control system that permits driving of a vehicle in a special mode of autonomous driving or the like only in a limited area, such as a manufacturing site or the like.

Related Art

In a limited area such as a factory or the like, a vehicle may drive in a special mode of autonomous driving or the like, which is different from driving on ordinary roads, and may operate so as to proceed to a subsequent production line. Because autonomous driving is employed, there is no need for operating staff to ride in the individual vehicles. Thus, complex operations by staff of the factory or the like may be avoided.

However, functions that operate the special mode of autonomous driving or the like feature vulnerabilities to malicious hacking and the like from outside. Therefore, in a case in which a vehicle is to run outside the limited area of a factory or the like, in accordance with shipping and the like, processing to disable the special mode is necessary. To disable the special mode, for example, software relating to the special mode may be overwritten or the like. However, when this software is overwritten, the condition of the vehicle changes from a condition thereof prior to a type approval inspection at shipping. Therefore, re-inspection of the vehicle is necessary.

Japanese Patent Application Laid-Open (JP-A) No. 2019-140577 discloses an invention relating to selection and replacement of an encryption key relating to operation of a vehicle in a special mode.

However, with the invention recited in JP-A No. 2019-140577, if hacking from outside occurs while a special mode of autonomous driving functions or the like is being disabled by a transmission prior to shipping of the vehicle, control over autonomous driving of the vehicle may be captured by an outside intruder.

SUMMARY

In consideration of the circumstances described above, an object of the present disclosure is to provide a vehicle control system that may safely disable functions of a special mode that is permitted for a vehicle in a limited area when the vehicle is to run outside that area.

In order to achieve the object described above, a vehicle control system according to a first aspect of the present disclosure includes: a vehicle control section that is mounted at a vehicle and controls the vehicle; and a control server that outputs a control signal to the vehicle control section, the control signal controlling the vehicle in a special mode including autonomous driving. In this vehicle control system: the vehicle control section generates a common key for special mode control by random number generation, outputs the generated common key to the control server, and stores the generated common key in secure storage including a function that protects integrity and confidentiality of data; the control server stores the common key outputted by the vehicle control section at a memory section, applies the common key to the control signal to generate a message authentication code of the control signal, and outputs the message authentication code and the control signal to the vehicle control section; the vehicle control section applies the common key stored in the secure storage to the control signal outputted by the control server to generate a message authentication code and, in a case in which the message authentication code generated by the vehicle control section matches the message authentication code outputted by the control server, implements control according to the control signal in the special mode; and in a case in which control in the special mode ends, the control server erases the common key stored at the memory section.

The common key used for control of the special mode is stored at the vehicle in the secure storage in the vehicle and at the control server in storage such as a hard disc drive (HDD) or the like. After control in the special mode has ended, the common key stored in the control server is erased. Hence, the common key is not present anywhere except the secure storage of the vehicle, resulting in a condition equivalent to a state in which control in the special mode is disabled. Because the secure storage of the vehicle has functions that protect the integrity and confidentiality of data, malicious exploitation of the functions of the special mode by hacking from outside or the like may be prevented.

According to the vehicle control system according to the first aspect of the present disclosure, control in the special mode is permitted by message authentication in a case in which the vehicle is located in a site such as a factory or the like, and control software in the vehicle is not altered after a time of shipping inspection. Therefore, there is no need for a repeat inspection of the vehicle.

In order to achieve the object described above, a vehicle control system according to a second aspect of the present disclosure includes: a vehicle control section that is mounted at each of a plurality of vehicles and controls each vehicle; and a control server that outputs a control signal to each vehicle control section, the control signal controlling each vehicle in a special mode including autonomous driving. In this vehicle control system: the control server generates a common key for special mode control by random number generation, outputs the generated common key to each vehicle control section of the plurality of vehicles, and stores the generated common key at a memory section; each vehicle control section of the plurality of vehicles stores the common key outputted by the control server in secure storage at each vehicle, the secure storage including a function that protects integrity and confidentiality of data; the control server applies the common key stored at the memory section to the control signal to generate a message authentication code of the control signal, and outputs the message authentication code and the control signal to each vehicle control section of the plurality of vehicles; each vehicle control section of the plurality of vehicles applies the common key stored in the secure storage to the control signal outputted by the control server to generate a message authentication code and, in a case in which the message authentication code generated by each vehicle control section matches the message authentication code outputted by the control server, implements control of each vehicle according to the control signal in the special mode; and in a case in which control in the special mode ends, the control server erases the common key stored at the memory section.

According to the vehicle control system according to the second aspect of the present disclosure, plural vehicles may be controlled in the special mode simultaneously in parallel. Thus, operations may be made quicker and operational procedures may be simplified.

As in a vehicle control system according to a third aspect of the present disclosure: control in the special mode may be implemented in a case in which the vehicle is located in a predetermined site; the vehicle may include a device configured to measure a current position of the vehicle, and the vehicle may output the current position to the control server; and in a case in which the current position of the vehicle is outside the predetermined site, the control server may erase the common key. Thus, the common key may be disabled in areas in which control in the special mode might be hazardous.

As in a vehicle control system according to a fourth aspect of the present disclosure, the vehicle control section may erase the common key stored in the secure storage in a case in which control in the special mode is no longer required. Thus, control in the special mode may be completely disabled.

As in a vehicle control system according to a fifth aspect of the present disclosure, the vehicle control section may erase the common key stored in the secure storage in a case in which a notification of shipping of the vehicle is implemented.

As described above, according to the vehicle control system according to the present disclosure, functions of a special mode that is permitted for the vehicle in a limited area may be safely disabled in a case in which the vehicle is to run outside that area.

BRIEF DESCRIPTION OF THE DRAWINGS

Exemplary embodiments of the present invention will be described in detail based on the following figures, wherein:

FIG. 7 is a flowchart showing an example of processing in each of a control server and plural vehicles according to a second exemplary embodiment.

DETAILED DESCRIPTION

First Exemplary Embodiment

Figure 1:
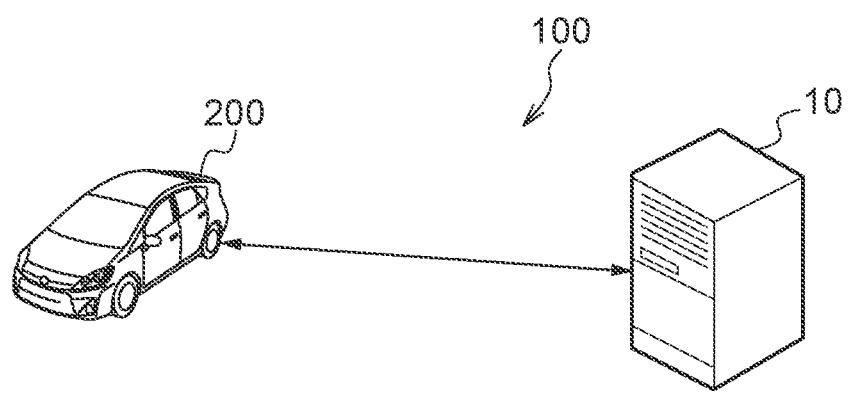
FIG. 1 is a schematic diagram showing an example of structures of a vehicle control system according to a first exemplary embodiment.

Below, a vehicle control system 100 according to exemplary embodiments of the present invention is described using FIG. 1. The vehicle control system 100 shown in FIG. 1 includes a vehicle 200 and a control server 10, which is configured to be capable of two-way communications with the vehicle 200. The control server 10 is a computer located at a site for production and preparation of the vehicle 200, such as a factory or the like.

It is desirable if the control server 10 is a computer capable of executing high-level computation processing at high speeds. The control server 10 must be configured with consideration for security, such as being equipped with a firewall that intercepts communications from outside and so forth. If the control server 10 is a cloud server, processing loads may be distributed. In the present exemplary embodiment, however, security is emphasized and the control server 10 should generally be a stand-alone server.

Figure 2:
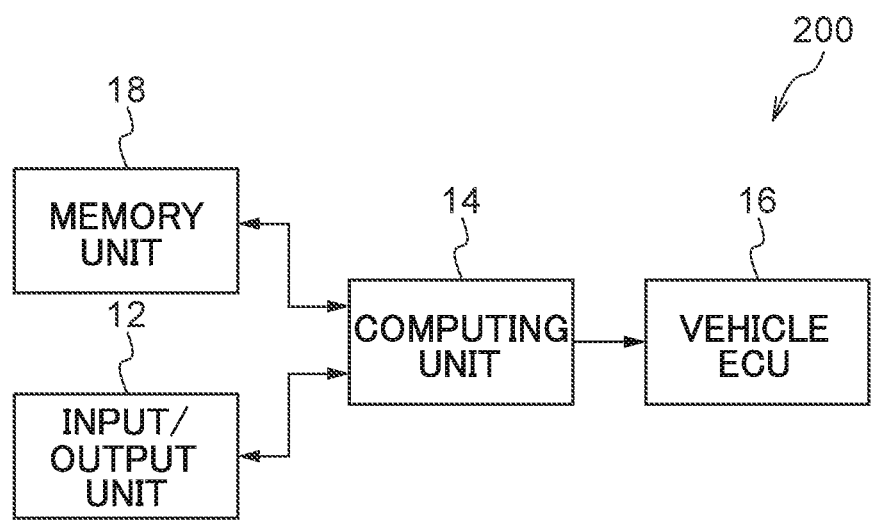
FIG. 2 is a block diagram showing an example of structures of a vehicle according to the first exemplary embodiment.

FIG. 2 is a block diagram showing an example of structures of the vehicle 200. The vehicle 200 is configured with a memory unit 18, an input/output unit 12, a computing unit 14 and a vehicle electronic control unit (ECU) 16. The memory unit 18 memorizes data required for computations at the computing unit 14 and computation results from the computing unit 14. The input/output unit 12 inputs signals from the control server 10 and the like and outputs signals to the control server 10 and the like. On the basis of input data inputted through the input/output unit 12 and data memorized at the memory unit 18, the computing unit 14 generates control signals in a special mode and outputs the generated control signals to the vehicle ECU 16. The vehicle ECU 16 operates the vehicle 200 in accordance with the special mode control signals inputted from the computing unit 14. A program installed at the memory unit 18 relates to common key generation by a MAC (Message Authentication Code) function, CMAC (Cipher-based Message Authentication Code) computations and so forth. By executing this program, the computing unit 14 generates public keys to be used in MAC authentication, generates MAC values of received data inputted from the control server 10 by CMAC computations, and conducts authentication to determine whether or not the generated MAC values match MAC values inputted from the control server 10. Message authentication is used in vehicle communications such as V2X and the like as a countermeasure against remote hacking of vehicles. In the present exemplary embodiment, for authentication of special mode control signals, different keys from message authentication keys that are used for countermeasures against remote vehicle hacking are employed. Secure storage is included at the memory unit 18, with functions for protecting the integrity and confidentiality of data. The computing unit 14 and the vehicle ECU 16 may be structured integrally.

Figure 3:
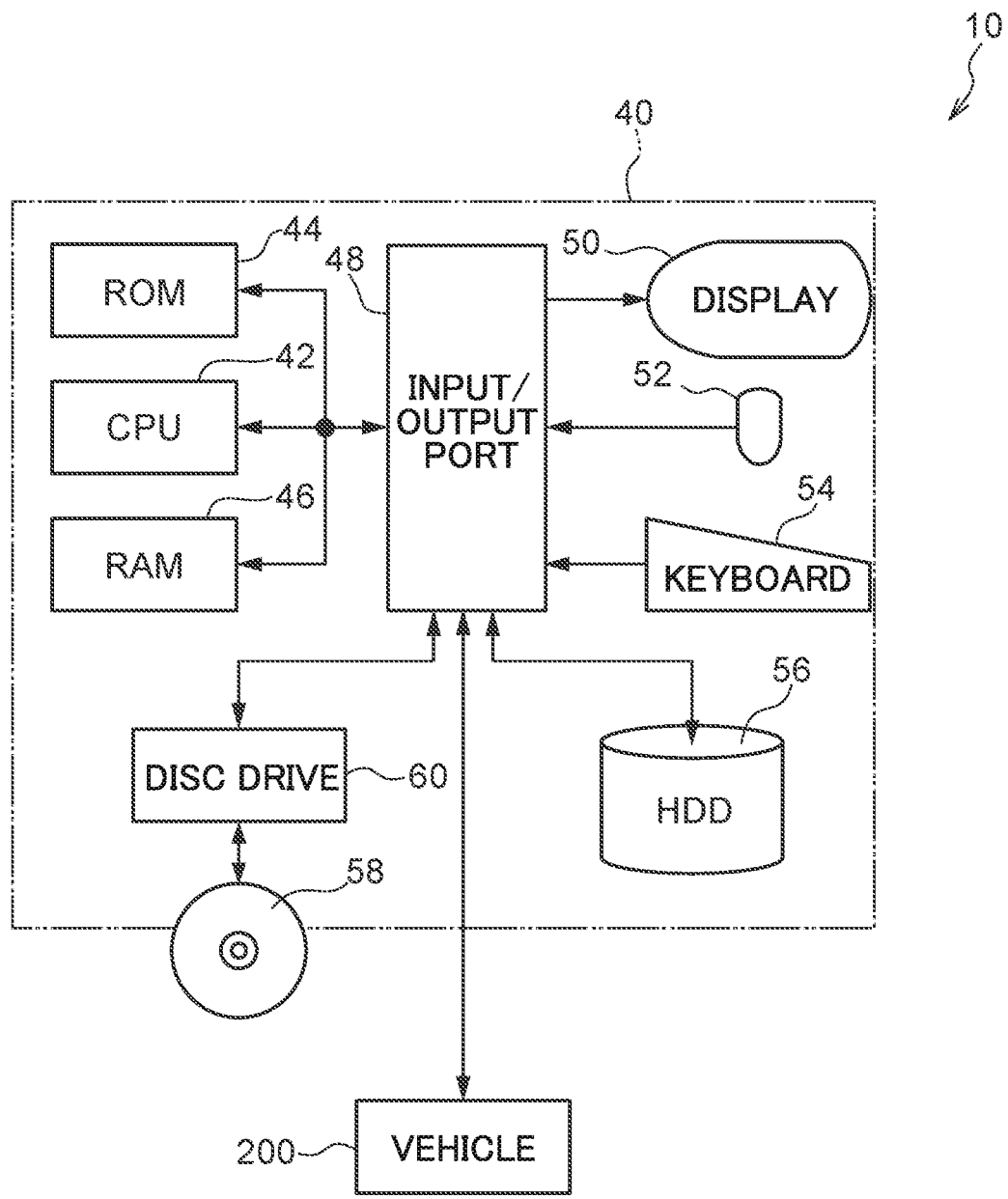
FIG. 3 is a block diagram showing an example of specific structures of a control server according to the first exemplary embodiment.

FIG. 3 is a block diagram showing an example of specific structures of the control server 10 according to the exemplary embodiment of the present disclosure. The control server 10 includes a computer 40. The computer 40 is equipped with a central processing unit (CPU) 42, read-only memory (ROM) 44, random access memory (RAM) 46 and an input/output port 48. It is desirable if the computer 40 is, for example, a type of computer that is capable of executing high-level computation processing at high speeds.

In the computer 40, the CPU 42, ROM 44, RAM 46 and input/output port 48 are connected to one another via various buses such as an address bus, a data bus and a control bus, or the like. The input/output port 48 is connected to each of various kinds of input/output apparatus, such as a display 50, a mouse 52, a keyboard 54, an HDD 56, and a disc drive 60 that reads information from various kinds of disc 58 (for example, CD-ROMs, DVDs and the like).

The vehicle 200 is connected to the input/output port 48. The control server 10 may be connected to the vehicle 200 via a network. With regard to the importance of security, this network should be an intranet that is isolated from the outside world.

A program relating to common key generation by a MAC function, CMAC computations and so forth is installed at the HDD 56 of the computer 40. In the present exemplary embodiment, when the CPU 42 executes this program, the CPU 42 generates a common key to be used for MAC authentication, generates MAC values of control signals relating to the special mode by CMAC computations, and outputs the generated MAC values to the vehicle 200 together with the control signals. The CPU 42 displays processing results from the program at the display 50. Generation of a common key to be used for MAC authentication at the control server 10 is described below in relation to a second exemplary embodiment.

Various methods are available for installing the program relating to MAC authentication according to the present exemplary embodiment at the computer 40. For example, the program is memorized at a CD-ROM, DVD or the like together with a setup program, this disc is set in the disc drive 60, and the program is installed at the HDD 56 by the setup program being executed at the CPU 42. Alternatively, the program may be installed at the HDD 56 by communication with other information processing equipment that is connected with the computer 40 via a public telephone circuit, a network or the like.

Figure 4:
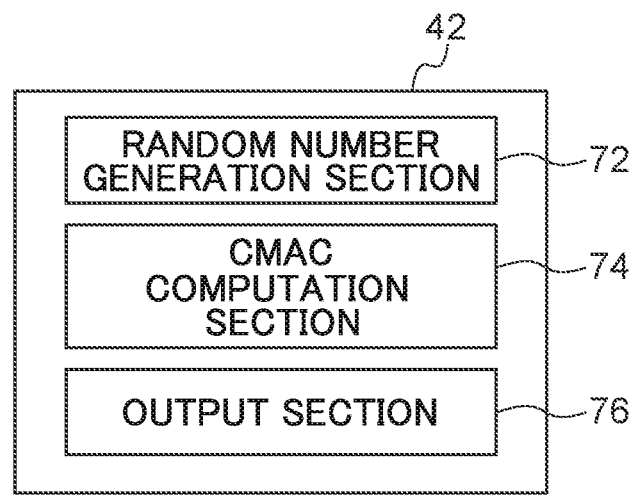
FIG. 4 is a functional block diagram of a CPU of the control server according to the first exemplary embodiment.

FIG. 4 shows a functional block diagram of the CPU 42 of the control server 10. Various functions that are realized by the CPU 42 of the control server 10 executing the program relating to MAC authentication are described. The program relating to MAC authentication provides: a random number generation function for generating a MAC key, which is a common key for special mode control, by random number generation according to the MAC function; a CMAC computation function for using the MAC key to generate MAC values to be message authentication codes of special mode control signals; and an output function for outputting the generated MAC key, the MAC values generated by the CMAC computation function and the control signals to the vehicle 200. By executing the program that includes these functions, the CPU 42 functions as a random number generation section 72, a CMAC computation section 74 and an output section 76, as illustrated in FIG. 4. Production of the MAC key by the random number generation function and output function at the CPU 42 is employed in the second exemplary embodiment described below.

Figure 5:
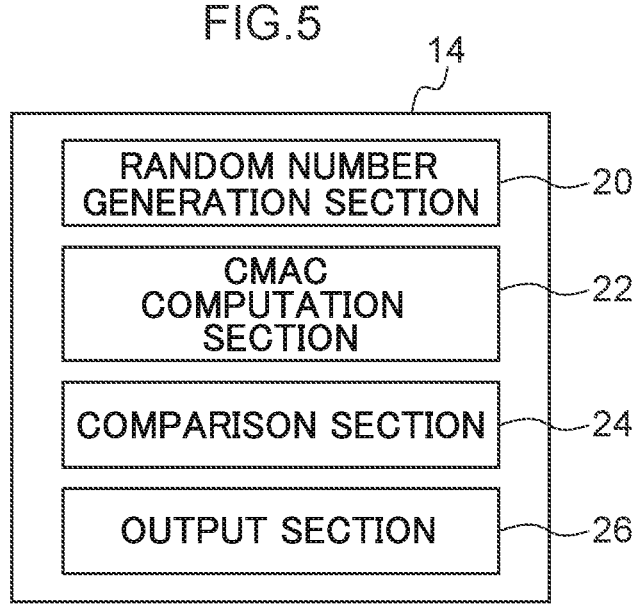
FIG. 5 is a functional block diagram of a computing unit according to the first exemplary embodiment.

FIG. 5 is a functional block diagram of the computing unit 14 of the vehicle 200. The computing unit 14 is provided with: a random number generation function for generating a MAC key to be a common key for special mode control by random number generation according to the MAC function; a CMAC computation function for using the MAC key to generate MAC values to be message authentication codes of special mode control signals; a comparison function for conducting MAC authentication by comparing a MAC value generated by the CMAC computation function with a MAC value inputted from the control server 10; and an output function for outputting the generated MAC key to the control server 10. By executing a program with these functions, the computing unit 14 functions as a random number generation section 20, a CMAC computation section 22, a comparison section 24 and an output section 26, as illustrated in FIG. 5.

Figure 6:
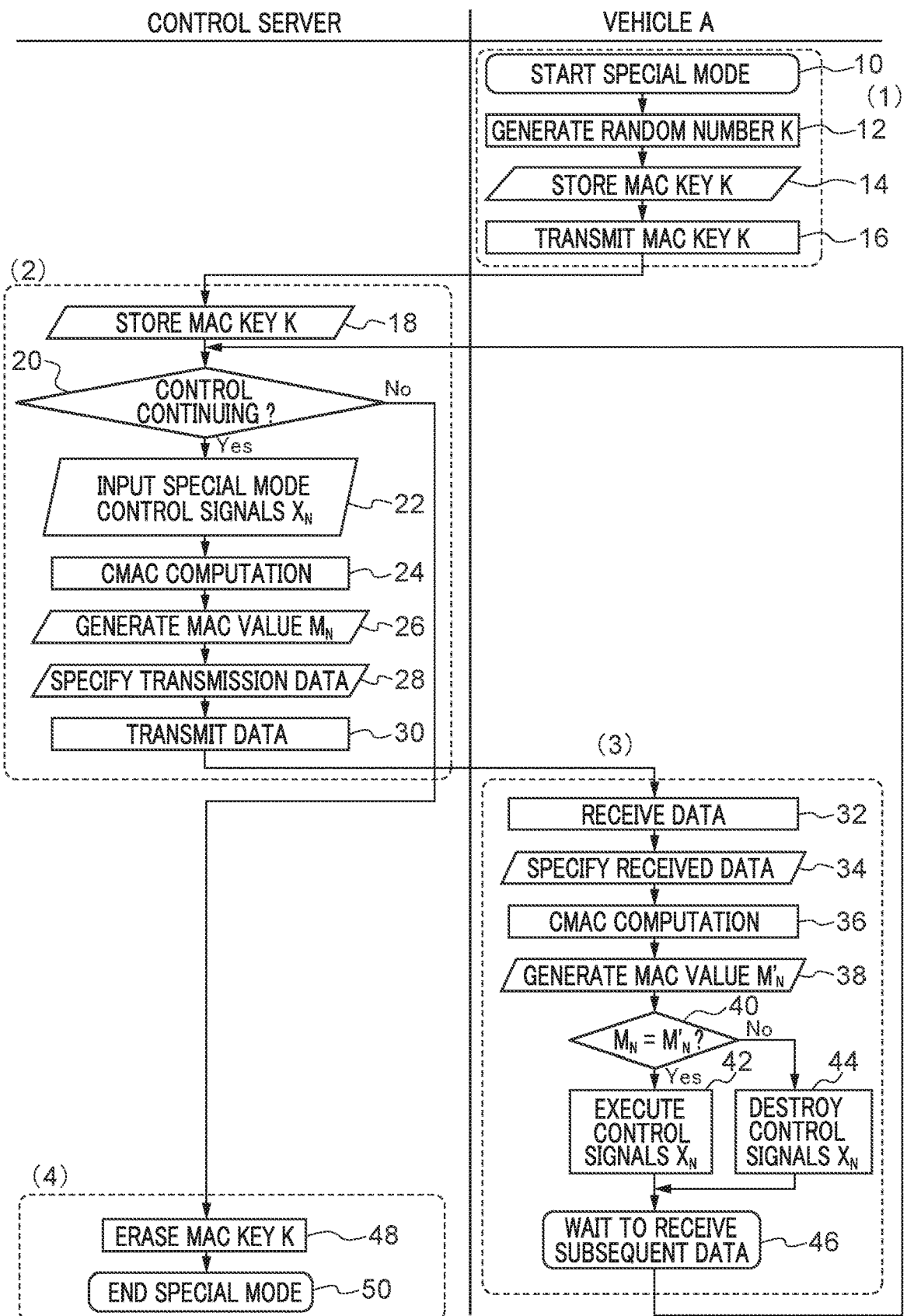
FIG. 6 is a flowchart showing an example of processing in each of the control server and the vehicle according to the first exemplary embodiment.

FIG. 6 is a flowchart showing an example of processing at each of the control server 10 and a vehicle A, which is one of the vehicle 200. In FIG. 6, processing at the vehicle A includes threads (1) and (3), and processing at the control server 10 includes threads (2) and (4).

In step 10 of thread (1) that is implemented at the vehicle A, a special mode of autonomous driving or the like is started. In step 12, the computing unit 14 generates a MAC key K to be used for special mode control from a random number. The MAC key K to be used in the special mode is made completely randomly for each vehicle. Therefore, it would be very difficult for an attacker to guess a key.

In step 14, the computing unit 14 stores the generated MAC key K in secure storage in the vehicle A. The secure storage is storage with functions to protect the integrity and confidentiality of data.

In step 16, the computing unit 14 transmits the generated MAC key K to the control server 10. The transmission of the MAC key K is generally conducted by wired communication in order to assure security. However, wireless communication may be employed provided security is assured by encryption of communication content and the like.

In step 18 of thread (2) that is implemented at the control server 10, the CPU 42 stores the MAC key K at storage such as the HDD 56 or the like. In the present exemplary embodiment, the MAC key K is stored only temporarily at the control server 10. As described below, when control of the vehicle A in the special mode is no longer required, the MAC key K stored at the control server 10 is erased. Therefore, the storage that stores the MAC key K need not be secure storage or the like with functions to protect the integrity and confidentiality of data.

In step 20, the CPU 42 makes a determination as to whether control is to continue. When control is to continue, due to a command to continue control being inputted from outside or the like, the CPU 42 proceeds to step 22. When control is not to continue, the CPU 42 proceeds to step 48.

In step 22, special mode control signals $X_N$ are inputted. The subscript N of the special mode control signals $X_N$ is, for example, a natural number that is at least 1, which is an identifier when plural kinds of special mode are available. The special mode control signals $X_N$ may be stored in advance at the HDD 56 of the control server 10 or the like, or may be inputted from external equipment.

In step 24, the CPU 42 uses the MAC key K to perform a CMAC computation, which is a message authentication encoding algorithm based on block encryption, of the special mode control signals $X_N$. In step 26, the CPU 42 generates a MAC value $M_N$. The MAC value $M_N$ is a message authentication code generated for the special mode control signals $X_N$ when the dedicated MAC key K is being employed.

In step 28, the CPU 42 specifies the special mode control signals $X_N$ and the MAC value $M_N$ as transmission data. In step 30, the CPU 42 transmits the specified transmission data to the vehicle A.

In step 32 of thread (3) that is implemented at the vehicle A, the computing unit 14 receives the transmission data from the control server 10. In step 34, the computing unit 14 extracts the special mode control signals $X_N$ and the MAC value $M_N$ from the received data. In the present exemplary embodiment, the computing unit 14 implements control according to the special mode control signals $X_N$ only when the MAC value $M_N$, which is a message authentication code generated when the dedicated MAC key K is being employed, is appended to the special mode control signals $X_N$ sent from the control server 10.

In step 36, the computing unit 14 uses the MAC key K to perform a CMAC computation, the message authentication encoding algorithm based on block encryption, of the special mode control signals $X_N$. In step 38, the computing unit 14 generates a MAC value $M'_N$.

In step 40, the computing unit 14 makes a determination as to whether the MAC value $M_N$ sent from the control server 10 matches the MAC value $M'_N$ generated from the special mode control signals $X_N$ at the vehicle A. If the MAC value $M_N$ and the MAC value $M'_N$ match in step 40, the computing unit 14 proceeds to step 42. If the MAC value $M_N$ and the MAC value $M'_N$ do not match, the computing unit 14 proceeds to step 44.

In step 42, the computing unit 14 executes the special mode control signals $X_N$ and proceeds to step 46. In step 44, the computing unit 14 discards the special mode control signals $X_N$ and proceeds to step 46.

In step 46, the computing unit 14 waits for a subsequent data transmission from the control server 10, and the processing proceeds to step 20.

In step 48 of thread (4) that is implemented at the control server 10, the CPU 42 erases the MAC key K that has been used. The CPU 42 may erase the MAC key K in step 48 when a device capable of measuring a current position of the vehicle A, such as a global positioning system (GPS) device or the like, detects that the vehicle A has departed from the site that is a factory or the like. In step 50, control in the special mode ends.

In the present exemplary embodiment, message authentication is incorporated in communications used in the special mode. Message authentication is used in vehicle communications such as V2X and the like as a countermeasure against remote hacking of vehicles. In the present exemplary embodiment, for authentication of special mode control signals, different keys from the message authentication keys that are used for countermeasures against remote vehicle hacking are employed.

Because the MAC keys K employed in the special mode are made completely randomly for individual vehicles, it would be very difficult for an attacker to guess a key.

A vehicle implements control according to special mode control signals $X_N$ sent from the control server 10 only when the MAC value $M_N$ that is a message authentication code generated when a dedicated MAC key K is being employed is appended to the special mode control signals $X_N$.

A MAC key K that is used for control in the special mode is stored both at the vehicle in the secure storage in the vehicle and at the control server 10 in storage such as the HDD 56 or the like. After control in the special mode has ended, the MAC key K stored in the control server 10 is erased. Hence, the MAC key K is not present anywhere except the secure storage of the vehicle, resulting in a condition equivalent to a state in which control in the special mode is disabled. Because the secure storage of the vehicle has functions that protect the integrity and confidentiality of data, the risk of a breach of confidentiality is low. However, in order to achieve more certain security, the MAC key K in the secure storage may be discarded when control in the special mode is no longer required. The MAC key K in the secure storage is discarded, for example, when a notification of shipping of the vehicle is provided from outside or the like. When a notification of shipping of the vehicle is implemented, the computing unit 14 discards the MAC key K in the secure storage. Alternatively, when a notification of shipping of the vehicle is implemented, the computing unit 14 may generate a command to discard the MAC key K in the secure storage and the MAC key K in the secure storage may be discarded in accordance with this command.

In the present exemplary embodiment, control in the special mode is permitted by message authentication when the vehicle is located in a site such as a factory or the like, and control software in the vehicle is not altered after a time of shipping inspection. Therefore, there is no need for a repeat inspection of the vehicle.

As described above, according to the present exemplary embodiment, functions of a special mode that is permitted for a vehicle in a limited area may be safely disabled when the vehicle is to run outside that area.

Second Exemplary Embodiment

Now, a second exemplary embodiment is described. The present exemplary embodiment differs from the first exemplary embodiment in that the control server 10 generates a MAC key $K\alpha$ and controls each of plural vehicles A and B in the special mode.

FIG. 7 is a flowchart showing an example of processing at each of the control server 10 and the plural vehicles A and B. In FIG. 7, processing at the control server 10 includes threads (1), (3) and (5), and processing at the vehicles A and B includes threads (2) and (4).

In step 100 of thread (1) that is implemented at the control server 10, a special mode a of autonomous driving or the like is started. In step 102, the CPU 42 generates a MAC key $K\alpha$ to be used for special mode control from a random number.

In step 104, the CPU 42 stores the generated MAC key $K\alpha$ at storage in the control server 10 such as the HDD 56 or the like. The MAC key $K\alpha$ that has been used is to be erased from the control server 10. Therefore, a memory device that stores the MAC key $K\alpha$ need not be storage with functions to protect the integrity and confidentiality of data such as secure storage or the like.

In step 106, the CPU 42 transmits the generated MAC key $K\alpha$ to each of the vehicles A and B. The transmission of the MAC key $K\alpha$ is generally conducted by wired communication in order to assure security. However, wireless communication may be employed provided security is assured by encryption of communication content and the like.

In step 108A and 108B of thread (2) that is implemented at each of the vehicles 108A and 108B, the computing units 14 store the MAC key $K\alpha$ at secure storage in the vehicles A and B.

In step 110 of thread (3) that is implemented at the control server 10, the CPU 42 makes a determination as to whether control is to continue. When control is to continue, due to a command to continue control being inputted from outside or the like, the CPU 42 proceeds to step 112. When control is not to continue, the CPU 42 proceeds to step 138.

In step 112, special mode control signals $X_N$ are inputted. The subscript N of the special mode control signals $X_N$ is, for example, a natural number that is at least 1, which is the identifier when plural kinds of special mode are available.

In step 114, the CPU 42 uses the MAC key $K\alpha$ to perform a CMAC computation, the message authentication encoding algorithm based on block encryption, of the special mode control signals $X_N$. In step 116, the CPU 42 generates a MAC value $M_N$.

In step 118, the CPU 42 specifies the special mode control signals $X_N$ and the MAC value $M_N$ as transmission data. In step 120, the CPU 42 transmits the specified transmission data to each of the vehicles A and B.

In steps 122A and 122B of thread (4) that is implemented at the vehicles A and B, the computing units 14 receive the transmission data from the control server 10. In steps 124A and 124B, the computing units 14 each extract the special mode control signals $X_N$ and the MAC value $M_N$ from the received data.

In steps 126A and 126B, the computing units 14 each use the MAC key Kα to perform a CMAC computation, the message authentication encoding algorithm based on block encryption, of the special mode control signals $X_N$. In steps 128A and 128B, the computing units 14 each generate a MAC value $M'_N$.

In steps 130A and 130B, the computing units 14 each make a determination as to whether the MAC value $M_N$ sent from the control server 10 matches the MAC value $M'_N$ generated from the special mode control signals $X_N$ at the vehicle A or B. If the MAC value $M_N$ and the MAC value $M'_N$ match in step 130A or 130B, the computing unit 14 proceeds to step 132A or 132B. If the MAC value $M_N$ and the MAC value $M'_N$ do not match, the computing unit 14 proceeds to step 134A or 134B.

In steps 132A and 132B, the computing units 14 each execute the special mode control signals $X_N$ and proceed to step 136A or 136B. In steps 134A and 134B, the computing units 14 each discard the special mode control signals $X_N$ and proceed to step 136A or 136B.

In step 136A (or step 136B), the computing unit 14 waits for a subsequent data transmission from the control server 10, and the processing proceeds to step 110.

In step 138 of thread (5) that is implemented at the control server 10, the CPU 42 erases the MAC key Kα that has been used. In step 140, control in the special mode ends.

As described above, the present exemplary embodiment may conduct control of plural vehicles in the special mode simultaneously in parallel. Thus, operations may be made quicker and operational procedures may be simplified.

A MAC key Kα that is used for control in the special mode is stored both at the vehicles in the secure storage in the vehicles and at the control server 10 in storage such as the HDD 56 or the like. After control in the special mode has ended, the MAC key Kα stored in the control server 10 is erased. Hence, the MAC key Kα is not present anywhere except the secure storage of the vehicles, resulting in a condition equivalent to a state in which control in the special mode is disabled. Because the secure storage of the vehicles has functions that protect the integrity and confidentiality of data, the risk of a breach of confidentiality is low. However, in order to achieve more certain security, the MAC key Kα in each secure storage may be discarded when control in the special mode is no longer required.

The "vehicle control section" recited in the attached Claims is equivalent to the computing unit 14 and vehicle ECU 16 recited in the Detailed Description of the present Specification, the "common key" recited in the attached claims is equivalent to the MAC key K and MAC key Kα recited in the Detailed Description, and the "message authentication code" recited in the attached claims is equivalent to the MAC value $M_N$ and MAC value $M'_N$ recited in the Detailed Description.

The processing that, in the exemplary embodiments described above, is executed by CPUs reading software (programs) may be executed by various kinds of processor other than a CPU. Examples of processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

In the exemplary embodiments described above, modes are described in which a program is memorized in advance (installed) at the disc drive 60 or the like, but this is not limiting. The program may be provided in a mode memorized on a non-transitory memory medium, such as a CD-ROM (compact disc read-only memory), DVD-ROM (digital versatile disc read-only memory), USB (universal serial bus) memory or the like. Modes are also possible in which the program is downloaded from external equipment via a network.

What is claimed is:

1. A vehicle control system comprising:
   a vehicle control section that is mounted at a vehicle and controls the vehicle; and
   a control server that transmits a control signal to the vehicle control section, the control signal controlling the vehicle in a special mode including autonomous driving, wherein:
   the vehicle control section generates a common key for special mode control by random number generation, transmits the generated common key to the control server, and stores the generated common key in secure storage including a function that protects integrity and confidentiality of data;
   the control server stores the common key transmitted by the vehicle control section at a memory section, applies the common key to the control signal to generate a message authentication code of the control signal, and transmits the message authentication code and the control signal to the vehicle control section;
   the vehicle control section applies the common key stored in the secure storage to the control signal transmitted by the control server to generate a message authentication code and, in a case in which the message authentication code generated by the vehicle control section matches the message authentication code transmitted by the control server, implements control according to the control signal in the special mode; and
   in a case in which control in the special mode ends, the control server erases the common key stored at the memory section.

2. The vehicle control system according to claim 1, wherein:
   control in the special mode is implemented in a case in which the vehicle is located in a predetermined site;
   the vehicle includes a device configured to measure a current position of the vehicle, and the vehicle transmits the current position to the control server; and
   in a case in which the current position of the vehicle is outside the predetermined site, the control server erases the common key.

3. The vehicle control system according to claim 2, wherein the vehicle control section erases the common key stored in the secure storage in a case in which control in the special mode is no longer required.

4. The vehicle control system according to claim 3, wherein the vehicle control section erases the common key stored in the secure storage in a case in which a notification of shipping of the vehicle is implemented.

5. The vehicle control system according to claim 1, wherein the vehicle control section erases the common key stored in the secure storage in a case in which control in the special mode is no longer required.

6. The vehicle control system according to claim 5, wherein the vehicle control section erases the common key stored in the secure storage in a case in which a notification of shipping of the vehicle is implemented.

7. A vehicle control system comprising:
a vehicle control section that is mounted at each of a plurality of vehicles and controls each vehicle; and
a control server that transmits a control signal to each vehicle control section, the control signal controlling each vehicle in a special mode including autonomous driving, wherein:
the control server generates a common key for special mode control by random number generation, transmits the generated common key to each vehicle control section of the plurality of vehicles, and stores the generated common key at a memory section;
each vehicle control section of the plurality of vehicles stores the common key transmitted by the control server in secure storage at each vehicle, the secure storage including a function that protects integrity and confidentiality of data;
the control server applies the common key stored at the memory section to the control signal to generate a message authentication code of the control signal, and transmits the message authentication code and the control signal to each vehicle control section of the plurality of vehicles;
each vehicle control section of the plurality of vehicles applies the common key stored in the secure storage to the control signal transmitted by the control server to generate a message authentication code and, in a case in which the message authentication code generated by each vehicle control section matches the message authentication code transmitted by the control server, implements control of each vehicle according to the control signal in the special mode; and
in a case in which control in the special mode ends, the control server erases the common key stored at the memory section.

8. The vehicle control system according to claim 7, wherein:
control in the special mode is implemented in a case in which the vehicle is located in a predetermined site;
the vehicle includes a device configured to measure a current position of the vehicle, and the vehicle transmits the current position to the control server; and
in a case in which the current position of the vehicle is outside the predetermined site, the control server erases the common key.

9. The vehicle control system according to claim 8, wherein the vehicle control section erases the common key stored in the secure storage in a case in which control in the special mode is no longer required.

10. The vehicle control system according to claim 9, wherein the vehicle control section erases the common key stored in the secure storage in a case in which a notification of shipping of the vehicle is implemented.

11. The vehicle control system according to claim 7, wherein the vehicle control section erases the common key stored in the secure storage in a case in which control in the special mode is no longer required.

12. The vehicle control system according to claim 11, wherein the vehicle control section erases the common key stored in the secure storage in a case in which a notification of shipping of the vehicle is implemented.

* * * * *